(12) United States Patent
Yagi et al.

(10) Patent No.: US 8,281,832 B2
(45) Date of Patent: Oct. 9, 2012

(54) RUBBER COMPOSITION AND PNEUMATIC TIRE USING THE SAME

(75) Inventors: Noriko Yagi, Kobe (JP); Kiyoshige Muraoka, Kobe (JP); Katsumi Terakawa, Kobe (JP); Tetsuo Mizoguchi, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 886 days.

(21) Appl. No.: 11/498,184

(22) Filed: Aug. 3, 2006

(65) Prior Publication Data

US 2007/0032593 A1 Feb. 8, 2007

(30) Foreign Application Priority Data

Aug. 4, 2005 (JP) .................... 2005-226771

(51) Int. Cl.
*B60C 1/00* (2006.01)
*B60C 13/00* (2006.01)
*B60C 11/00* (2006.01)

(52) U.S. Cl. ............... 152/450; 152/525; 152/209.1

(58) Field of Classification Search .......... None
See application file for complete search history.

(56) References Cited

U.S. PATENT DOCUMENTS

| | | | |
|---|---|---|---|
| 5,290,910 A | 3/1994 | Shiotani et al. | |
| 5,292,860 A | 3/1994 | Shiotani et al. | |
| 5,691,403 A * | 11/1997 | Shitaohzono et al. | 524/47 |
| 6,210,844 B1 * | 4/2001 | Sondergeld | 430/11 |
| 6,262,184 B1 * | 7/2001 | Kanamori et al. | 525/411 |
| 6,573,340 B1 * | 6/2003 | Khemani et al. | 525/437 |
| 6,720,365 B2 * | 4/2004 | Inagaki et al. | 523/124 |
| 2002/0065389 A1 | 5/2002 | Honma et al. | |
| 2003/0109015 A1 | 6/2003 | Kenmoku et al. | |
| 2004/0006200 A1 | 1/2004 | Nakagawa et al. | |
| 2006/0211100 A1 | 9/2006 | Kenmoku et al. | |
| 2008/0033077 A1 | 2/2008 | Hashimoto et al. | |

FOREIGN PATENT DOCUMENTS

| | | | |
|---|---|---|---|
| EP | 0 995 775 A1 | | 4/2000 |
| EP | 1 127 089 A | | 8/2001 |
| JP | 02133456 | * | 5/1990 |
| JP | 06-116444 A | | 4/1994 |
| JP | 07 304902 A | | 11/1995 |
| JP | 8-12813 A | | 1/1996 |
| JP | 9-508426 A | | 8/1997 |
| JP | 2000 319446 A | | 11/2000 |
| JP | 2000319446 | * | 11/2000 |

(Continued)

OTHER PUBLICATIONS

Notice of Grounds of Rejection dated Jun. 5, 2012 of corresponding Japanese Patent Application No. 2006-300082.

*Primary Examiner* — Justin Fischer
(74) *Attorney, Agent, or Firm* — Birch, Stewart, Kolasch & Birch, LLP

(57) ABSTRACT

To provide a pneumatic tire which can reduce fuel consumption without causing reduction in grip performance and after use of which can be degraded by microorganisms. The present invention relates to a rubber composition including 100 parts by mass of a rubber component including a natural rubber and/or a diene rubber and 0.5 to 80 parts by mass of a biodegradable aliphatic polyester. The biodegradable aliphatic polyester is preferably one or more species selected from polylactic acid, polycaprolactone and polyalkylene succinate.

6 Claims, 1 Drawing Sheet

FOREIGN PATENT DOCUMENTS

| | | |
|---|---|---|
| JP | 2001-316462 A | 11/2001 |
| JP | 2003-96171 A | 4/2003 |
| JP | 2004-99738 A | 4/2004 |
| JP | 2004-162044 A | 6/2004 |
| JP | 2005-002259 A | 1/2005 |
| JP | 2005 029758 A | 2/2005 |
| JP | 2005 154586 A | 6/2005 |
| JP | 2005-255722 A | 9/2005 |
| KR | 2002 0089889 A | 11/2002 |
| WO | WO 95/20621 A1 | 8/1995 |
| WO | WO 2006/064846 A1 | 6/2006 |

\* cited by examiner

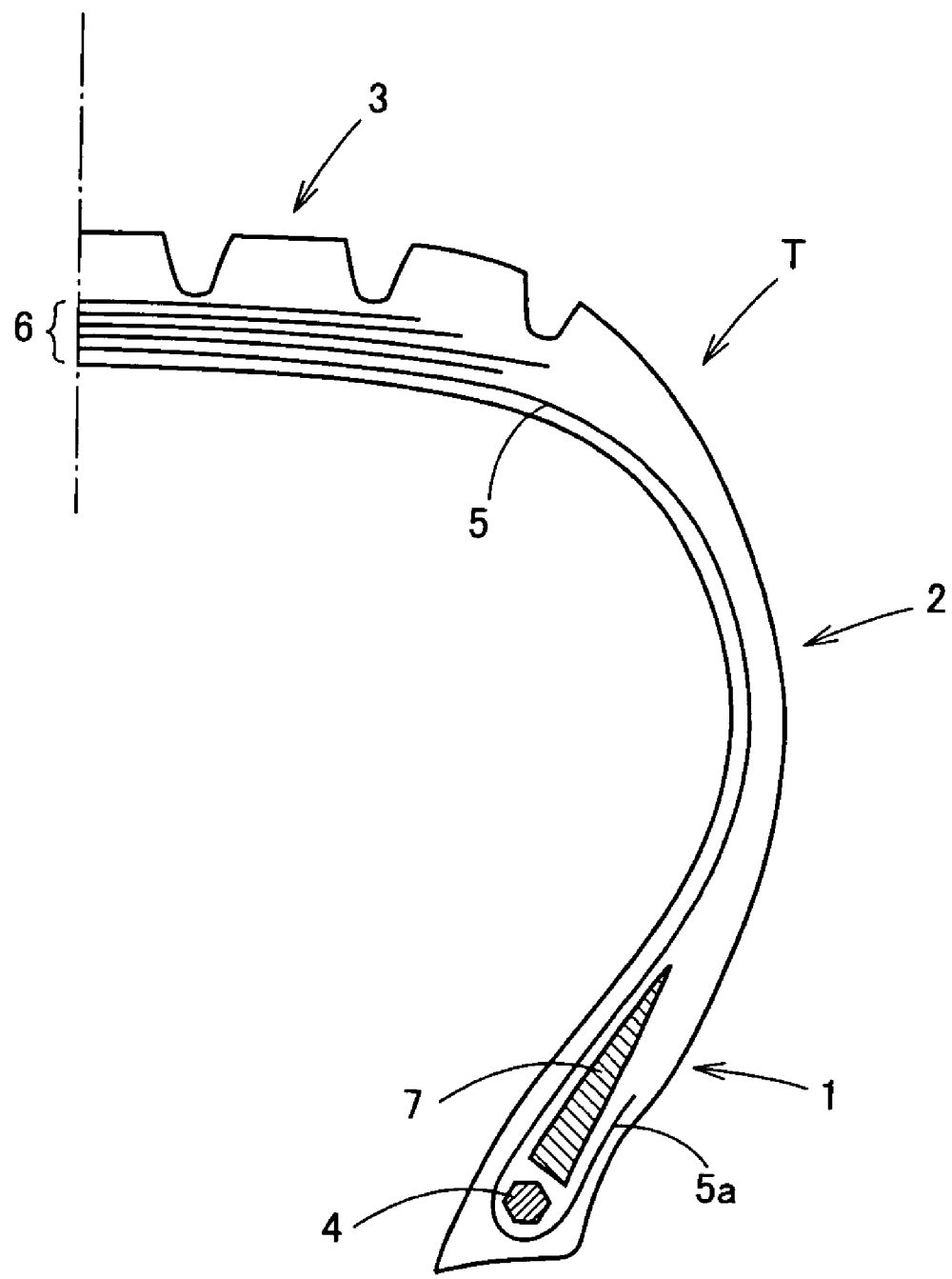

RUBBER COMPOSITION AND PNEUMATIC TIRE USING THE SAME

This nonprovisional application is based on Japanese Patent Application No. 2005-226771 filed with the Japan Patent Office on Aug. 4, 2005, the entire contents of which are hereby incorporated by reference.

BACKGROUND OF THE INVENTION

1. Field of the Invention

The present invention relates to a rubber composition including biodegradable aliphatic polyester and to a pneumatic tire using the composition.

2. Description of the Background Art

In recent years, from the viewpoint of environmental problems such as tightening regulations for resource conservation and prevention of carbon dioxide ($CO_2$) exhaust, importance is attached to the fuel efficiency of tires and coexistence with the fuel efficiency and tire characteristics, such as grip performance, is an urgent task. For improving the fuel efficiency, many methods using silica and a silane coupling agent have been reported. However, performance requirements have not been satisfied.

Also in the used tire recycling field, material recycling in which rubber chips or a rubber powder of tires are reused directly as rubber is demanded to be practically applied. As a method of such recycling, a method including application of a strong shear force to rubber chips or a rubber powder by a biaxial extruder or the like, followed by pulverization and desulfurization is studied, for example. Such physical treatment, however, has a problem of needing a large amount of energy. Under such circumstances, as methods of material recycling using less energy, there are many proposals of methods for decomposition of various types of rubber using microorganisms. Such methods using microorganisms, however, have a poor practical usability problem due to, for example, a long treatment time. Japanese Patent Laying-Open No. 2004-099738 proposes a method of degrading vulcanized rubber compositions contained in waste rubber products like waste tires by use of wood-rotting fungus. By this method, waste tires can be decomposed and disposed relatively easily, but there is no consideration for improvement in properties of tires in Japanese Patent Laying-Open No. 2004-099738.

Similarly in the resin industry, development of resin which can be decomposed with time by the action of microorganisms or the like, i.e., biodegradable resin, is in progress from the viewpoint of environmental protection. Like conventional plastic materials, such biodegradable resins can be used for the production of various products by melt processing or the like. In addition, biodegradable resins have an advantage that they are degraded by microorganisms in nature. They, therefore, do not remain in the natural environment and do not cause environmental pollution unlike many conventional organic polymer compounds. However, there is a problem that since resin does not have flexibility like that of rubber, it is difficult to use resin for rubber compositions for tires.

Further, regarding tires containing natural resources, a method using a starch composite has been proposed, for example. This method, however, needs a mixing step at high temperature for fully dispersing the starch composite and, therefore, the process is not only complicated but the degradation of polymers is accelerated.

SUMMARY OF THE INVENTION

The present invention intends to overcome the problems mentioned above and to provide a pneumatic tire which can provide an improved fuel efficiency without causing deterioration in grip performance and the degradation of which is accelerated, after use, by microorganisms.

The present invention relates to a rubber composition including 100 parts by mass of a rubber component including a natural rubber and/or a diene rubber and 0.5 to 80 parts by mass of a biodegradable aliphatic polyester.

In the present invention, it is preferable that the biodegradable aliphatic polyester be one or more species selected from polylactic acid, polycaprolactone and polyalkylene succinate.

It is also preferable that the biodegradable aliphatic polyester have a weight-average molecular weight within the range of from 500 to 800,000.

It is also preferable that the glass transition temperature of the biodegradable aliphatic polyester be within the range of from −70° C. to 30° C.

In the present invention, it is preferable that the rubber component includes a functional group-containing natural rubber and/or a functional group-containing diene rubber each having at least one kind of functional group selected from the group consisting of an alkoxyl group, an alkoxysilyl group, an epoxy group, a glycidyl group, a carbonyl group, an ester group, a hydroxyl group, an amino group and a silanol group. In addition, it is preferable that the rubber component include an epoxidized natural rubber.

The rubber composition of the present invention preferably includes silica in an amount within the range of from 5 to 150 parts by mass based on 100 parts by mass of the rubber component, and a silane coupling agent in an amount within the range of from 1 to 20% by mass based on the content of the silica.

The present invention relates also to a pneumatic tire using the aforementioned rubber composition.

In the present invention, use of a rubber composition including a biodegradable aliphatic polyester makes it possible to obtain a pneumatic tire which can reduce fuel consumption without causing reduction in grip performance and after use of which can be degraded by microorganisms.

Further, in the present invention, use of a rubber composition including a biodegradable aliphatic polyester for forming a tread, a sidewall, a carcass ply, a belt ply and the like of a pneumatic tire makes it possible to obtain a pneumatic tire which can reduce fuel consumption without causing reduction in grip performance and after use of which can be degraded by microorganisms.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a sectional view showing the right half of a pneumatic tire according to the present invention.

DESCRIPTION OF THE PREFERRED EMBODIMENTS

The rubber composition of the present invention includes 100 parts by mass of a rubber component including a natural rubber and/or a diene rubber, and a biodegradable aliphatic polyester in an amount within the range of from 0.5 to 80 parts by mass. The biodegradable aliphatic polyester as referred to herein means an aliphatic polyester which is degraded in vivo or by the action of microorganisms.

In particular, the biodegradable aliphatic polyester which is blended in the rubber composition of the present invention is preferably one which can be decomposed eventually into carbon dioxide and water by the action of microorganisms. In this case, it becomes possible to decompose pneumatic tires after use more easily.

The biodegradable aliphatic polyester included in the rubber composition of the present invention is preferred to be at least one species selected from polylactic acid, polycaprolactone and polyalkylene succinate. These aliphatic polyesters are excellent in biodegradability by a microorganisms and use of such aliphatic polyesters makes it possible to secure a good grip performance and low fuel consumption.

The biodegradable aliphatic polyester is blended within a range of from 0.5 to 80 parts by mass based on 100 parts by mass of the rubber component including a natural rubber and/or a diene rubber. Blending of a biodegradable aliphatic polyester in an amount of less than 0.5 parts by mass fails to produce an effect of improving the fuel efficiency and biodegradability satisfactorily. When the amount of a biodegradable aliphatic polyester is over 80 parts by mass, the dispersibility of the biodegradable aliphatic polyester is deteriorated and, as a result, a satisfactory abrasion resistance is not obtained. The amount of the biodegradable aliphatic polyester blended is preferably set within the range of from 1 to 60 parts by mass, and more preferably from 2 to 50 parts by mass.

In the present invention, it is also preferable that the biodegradable aliphatic polyester have a weight-average molecular weight within the range of from 500 to 800,000. On the other hand, when the weight-average molecular weight is 500 or more, a rubber composition excellent in physical strength is obtained. When the weight-average molecular weight is 800,000 or less, it is possible to disperse the biodegradable aliphatic polyester in the rubber composition uniformly and therefore, the abrasion resistance hardly decreases. In addition, after use of tires, it is possible to make biodegradation by microorganisms proceed in a relatively short period of time. The weight-average molecular weight of the biodegradable aliphatic polyester blended is preferably set within the range of from 500 to 500,000, and more preferably from 500 to 100,000.

The glass transition temperature (Tg) of the biodegradable aliphatic polyester is preferably within the range of from $-70°$ C. to $30°$ C. When the glass transition temperature is $-70°$ C. or higher, the rolling resistance property and the abrasion resistance are satisfactory. When the glass transition temperature is $30°$ C. or lower, the grip performance is good and the compatibility with a rubber component is also excellent. The glass transition temperature is more preferably within the range of from $-60°$ C. to $20°$ C.

The molecular structure of a biodegradable aliphatic polyester and the content of the biodegradable aliphatic polyester blended in a rubber composition can be evaluated using a nuclear magnetic resonance analyzer (NMR), an infrared absorption spectrum, etc. The weight-average molecular weight and the glass transition temperature can be evaluated using a gel permeation chromatograph (GPC) or the like and a differential scanning calorimeter or the like, respectively.

Preferable examples of biodegradable aliphatic polyester for use in the present invention include those of microbially-produced type, e.g., polyhydroxybutyrate such as "Biogreen" available from Mitsubishi Gas Chemical Co., Inc.; and those of chemically-synthesized type, e.g., polylactic acid such as "Nature Works" available from Cargill Dow LLC, "Lacea" available from Mitsui Chemicals, Inc., "Lactron" available from Kanebo Synthetic Fiber Inc., and "Plamate" available from Dainippon Ink and Chemicals, Inc.; polycaprolactone such as "TONE" available from Dow Chemical Co., Ltd. and "Celgreen PH" available from Daicel Chemical Industries, Ltd.; poly(caprolactone/butylene succinate) such as "Celgreen CBS" available from Daicel Chemical Industries, Ltd.; polybutylene succinate such as "Bionolle" available from Showa Highpolymer Co., Ltd.; poly(butylene succinate/adipate) such as "Bionolle" available from Showa Highpolymer Co., Ltd. and "Enpol" made by Ire Chemical Ltd.; poly(butylene succinate/carbonate) such as "IYPEC" available from Mitsubishi Gas Chemical Co., Inc.; poly(ethylene terephthalate/succinate) such as "Biomax" available from E.I. du Pont de Nemours & Co.; poly(butylene adipate/terephthalate) such as "Ecoflex" available from BASF A.G. and "EnPol" available from Ire Chemical Ltd.; poly(tetramethylene adipate/terephthalate) such as "Eastar Bio" available from Eastman Chemical Co., and polyethylene succinate such as "Lunare SE" available from Nippon Shokubai Co., Ltd. These may be used singly or in combination.

The rubber component of the present invention includes a natural rubber and/or a diene rubber. Examples of the diene rubber include styrene-butadiene rubber (SBR), butadiene rubber (BR), isoprene rubber (IR), ethylene-propylene-diene rubber (EPDM), chloroprene rubber (CR), acrylonitrile-butadiene rubber (NBR), butyl rubber (IIR) and halogenated butyl rubber. Such rubbers may be used singly or in combination of two or more.

It is preferable that the rubber component of the present invention include a functional group-containing natural rubber and/or a functional group-containing diene rubber each having at least one kind of functional group selected from the group consisting of an alkoxyl group, an alkoxysilyl group, an epoxy group, a glycidyl group, a carbonyl group, an ester group, a hydroxyl group, an amino group and a silanol group. Inclusion of such functional groups in a natural rubber and/or a diene rubber results in an effect that the compatibility of the rubber component with the biodegradable aliphatic polyester is improved. Inclusion of an epoxidized natural rubber in the rubber component is preferable because it results in a very high compatibility of the rubber component with the biodegradable aliphatic polyester.

It is preferable that the at least one kind of functional groups selected from an alkoxyl group, an alkoxysilyl group, an epoxy group, a glycidyl group, a carbonyl group, an ester group, a hydroxyl group, an amino group and a silanol group are contained in the functional group-containing natural rubber or functional group-containing diene rubber in an amount within the range of from 1 to 80 mol %. When the content of the functional groups is 1 mol % or more, the effect of improving the compatibility of the rubber component with the biodegradable aliphatic polyester is favorably obtained. When the content is 80 mol % or less, the viscosity increase during the production of an unvulcanized rubber composition is controlled, resulting in good processability.

Examples of the method for making a natural rubber and/or a diene rubber contain at least one kind of functional groups selected from alkoxyl group, alkoxysilyl group, epoxy group, glycidyl group, carbonyl group, ester group, hydroxyl group, amino group and silanol group include a method in which functional groups are introduced, in hydrocarbon solvent, to terminals of styrene-butadiene copolymers polymerized using an organolithium initiator; and a method in which a natural rubber or a diene rubber is epoxidized by the chlorohydrin method, the direct oxidation method, the hydrogen peroxide method, the alkylhydroperoxide method, the peracid method, etc.

In the present invention, it is preferable that the rubber composition include silica in an amount within the range of from 5 to 150 parts by mass based on 100 parts by mass of the rubber component, and a silane coupling agent in an amount within the range of from 1 to 20% by mass based on the content of the silica. When the amount of silica blended is 5 parts by mass or more, the amount of heat generating in a tire during driving is reduced and satisfactory wet grip performance and abrasion resistance are achieved. When the amount of silica is 150 parts by mass or less, the increase in viscosity during the preparation of an unvulcanized rubber composition is controlled and, as a result, satisfactory processability and workability are obtained during the preparation of a rubber composition. The content of silica is more preferably set within the range of from 10 to 120 parts by mass, and even more preferably from 15 to 100 parts by mass.

Silica which has been used conventionally for the reinforcement of rubber may be used. For example, silica properly selected from dry method silica, wet method silica, colloidal silica and the like may be used. It is preferable to use silica having a nitrogen adsorption specific surface area ($N_2SA$) within the range of from 100 to 300 $m^2/g$ and more preferably within the range of from 120 to 280 $m^2/g$. Cases where the silica has an $N_2SA$ of 100 $m^2/g$ or more are preferable because a great effect of reinforcing the rubber composition is obtained. Case where the silica has an $N_2SA$ of 300 $m^2/g$ or less are preferable because the dispersibility of the silica in the rubber composition is satisfactory and it is possible to prevent the increase in the heat generation property of the rubber composition.

The rubber composition of the present invention preferably includes a silane coupling agent. When the content of the silane coupling agent based on the content of silica is 1% by mass or more, a sufficient coupling effect caused by the incorporation of the silane coupoling agent can be obtained. Even if more than 20% by mass of silane coupling agent is blended, the coupling effect increases in a small degree for a cost increase and if the content of a silane coupling agent is too large, the reinforcing property and the abrasion resistance will be deteriorated. It, therefore, is desirable that the content of a silane coupling agent to the content of silica be set not more than 20% by mass. It is particularly preferable that the content be set within the range of from 2 to 15 parts by mass.

As the silane coupling agent, any silane coupling agent which are conventionally used together with silica filler may be employed. Specific examples include bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-methyldiethoxysilylpropyl)tetrasulfide, bis(2-methyl diethoxysilylethyl) tetrasulfide, bis(4-methyl diethoxysilylbutyl) tetrasulfide, bis(3-methyl dimethoxysilylpropyl)tetrasulfide, bis(2-methyl dimethoxysilylethyl)tetrasulfide, bis(4-methyl dimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilyl ethyl)trisulfide, bis(4-trimethoxysilylbutyl)trisulfide, bis(3-triethoxysilylpropyl)disulfide, bis (2-triethoxysilylethyl) disulfide, bis(4-triethoxysilylbutyl)disulfide, bis(3-trimethoxysilylpropyl)disulfide, bis(2-trimethoxysilylethyl) disulfide, bis(4-trimethoxysilylbutyl)disulfide, bis(3-methyl diethoxysilylpropyl) disulfide, bis(2-methyl diethoxysilylpropyl) disulfide, bis(4-methyl diethoxypropyl)disulfide, bis (3-methyl dimethoxysilylpropyl) disulfide, bis(2-methyldimethoxysilylpropyl) disulfide, bis(4-methyl dimethoxysilylbutyl) disulfide, 3- mercaptopropyltrimethoxysilane, 3-mercaptopropyltriethoxysilane, 2-mercaptoethyl trimethoxysilane, 2-mercaptoethyltriethoxysilane, 3-aminopropyltriethoxysilane, 3-aminopropyl trimethoxysilane, 3-(2-aminoethyl)aminopropyl triethoxysilane, 3-(2-aminoethyl)aminopropyl trimethoxysilane, γ-glycidoxypropyltriethoxysilane, γ-glycidoxypropyltrimetoxysilane, γ-glycidoxypropyl methyldietoxysilane and γ-glycidoxypropyl methyldimethoxysilane.

In particular, bis(3-triethoxysilylpropyl)tetrasulfide, bis(3-triethoxysilylpropyl)disulfide and the like are particularly preferably employed from the viewpoint of the compatibleness between the coupling effect and the production cost. Such silane coupling agents may be used singly or in combination of two or more.

The rubber composition of the present invention may, according to necessity, include additives, such as filler e.g. carbon black, softeners, antioxidants, antiozonants, age inhibitors, vulcanizing agents such as sulfur, vulcanization accelerators, vulcanization accelerator assistants, peroxides, zinc oxide and stearic acid, in addition to the rubber components, biodegradable aliphatic polyester, silica and silane coupling agent.

When carbon black is blended, the amount of the carbon black blended is preferably set to be 100 parts by mass or less, more preferably within the range of from 20 to 80 parts by mass, based on 100 parts by mass of the rubber component. When the amount of carbon black blended is 100 parts by mass or less, there is not much risk of deteriorating the dispersibility and workability during the preparation of the rubber composition.

Carbon black having a nitrogen adsorption specific surface area set within the range of from 80 to 280 $m^2/g$, more preferably within the range of from 100 to 200 $m^2/g$, is preferably employed. When the nitrogen absorption specific surface area is 80 $m^2/g$ or more, satisfactory wet grip performance and abrasion resistance are achieved when the rubber composition is used in a tire. A nitrogen absorption specific surface area of 280 $m^2/g$ or less prevents deterioration of the abrasion resistance of a rubber composition caused by poor dispersion of carbon black during the preparation of the rubber composition.

The rubber composition of the present invention includes a silane coupling agent, which may, if necessary, be used together with other coupling agents such as aluminate type coupling agents and titanium-containing coupling agents.

For the preparation of the rubber composition for tires of the present invention, inorganic filler, such as clay, alumina, talc, calcium carbonate, magnesium carbonate, aluminum hydroxide, magnesium hydroxide, magnesium oxide and titanium oxide, may further be used singly or in combination of two or more.

Examples of the softener include petroleum softener such as process oil, lubricating oil, paraffin, liquid paraffin, petroleum asphalt and petrolatum, fatty oil type softener such as soy bean oil, palm oil, castor oil, linseed oil, rape oil and coconut oil, waxes such as tall oil, factice, beeswax, carnauba wax and lanolin, and fatty acid such as linoleic acid, palmitic acid, stearic acid and lauric acid. The amount of the softener used is preferably set to 100 parts by mass or less for 100 parts by mass of the rubber components. In such cases, there is not much risk of lowering the wet grip performance when the rubber composition is used for tires.

As the vulcanizing agent, an organic peroxide or a sulfur-based vulcanizing agent may be used. As the organic peroxide, benzoyl peroxide, dicumyl peroxide, di-tert-butyl peroxide, tert-butyl cumyl peroxide, methyl ethyl ketone peroxide, cumene hydroperoxide, 2,5-dimethyl-2,5-di-(tert-butylperoxy)hexane, 2,5-dimethyl-2,5-di(benzoylperoxy)hexane, 2,5-dimethyl-2,5-di-(tert-butylperoxy)hexyne-3 and 1,3-bis (tert-butylperoxypropyl)benzene may be used, for example. As the sulfur-based vulcanizing agent, sulfur and morpholine disulfide may be used, for example. In particular, sulfur is preferred.

As the vulcanizing accelerator, any accelerator may be employed that contains at least one of sulfenamide type accelerator, thiazole type accelerator, thiuram type accelerator, thiourea type accelerator, guanidine type accelerator, dithiocarbamate type accelerator, aldehyde-amine type or aldehyde-ammonia type accelerator, imidazoline type accelerator and xanthate type accelerator.

Examples of the sulfenamide type accelerator include sulfenamide type compounds such as CBS (N-cyclohexyl-2-benzothiazyl sulfenamide), TBBS (N-tert-butyl-2-benzothiazyl sulfenamide), N,N-dicyclohexyl-2-benzothiazyl sulfenamide, N-oxydiethylene-2-benzothiazyl sulfenamide and N,N-diisopropyl-2-benzothiazole sulfenamide.

Examples of the thiazole type accelerator include MBT (2-mercaptobenzothiazole), MBTS (dibenzothiazyl disulfide), sodium salt of 2-mercaptobenzothiazole, zinc salt of 2-mercaptobenzothiazole, copper salt of 2-mercaptobenzothiazole, cyclohexyl amine salt of 2-mercaptobenzothiazole, 2-(2,4-dinitrophenyl)mercaptobenzothiazole and 2-(2,6-diethyl-4-morpholinothio)benzothiazole.

Examples of the thiuram type accelerator include TMTD (tetramethylthiuram disulfide), tetraethylthiuram disulfide, tetramethylthiuram monosulfide, dipentamethylenethiuram disulfide, dipentamethylenethiuram monosulfide, dipentamethylenethiuram tetrasulfide, dipentamethylenethiuram hexasulfide, tetrabuthylthiuram disulfide and pentamethylenethiuram tetrasulfide.

Examples of the thiourea type accelerator include thiourea compounds such as thiocarbamide, diethyl thiourea, dibutyl thiourea, trimethyl thiourea and diorthotolyl thiourea.

Examples of the guanidine type accelerator include guanidine compounds such as diphenylguanidine, diorthotolylguanidine, triphenylguanidine, orthotolylbiguanide and diphenylguanidine phthalate.

Examples of the dithiocarbamate type accelerator include dithiocarbamate compounds such as zinc ethylphenyl dithiocarbamate, zinc butylphenyl dithiocarbamate, sodium dimethyl dithiocarbamate, zinc dimethyl dithiocarbamate, zinc diethyl dithiocarbamate, zinc dibutyl dithiocarbamate, zinc diamyl dithiocarbamate, zinc dipropyl dithiocarbamate, complex salt of zinc pentamethylene dithiocarbamate and piperidine and zinc hexadecyl (or octadecyl) isopropyl dithiocarbamate.

Examples of the aldehyde-amine type or aldehyde-ammonia type accelerator include reaction products of acetaldehyde and aniline, condensates of butyraldehyde and aniline, hexamethylene tetramine and reaction products of acetaldehyde and ammonia.

As the age inhibitor, one which is selected appropriately from amine compounds, phenol compounds, imidazole compounds, metal salts of carbamate and wax may be used.

Further, the rubber composition for tires of the present invention may include a plasticizer, if necessary. Specific examples thereof include DMP (dimethyl phthalate), DEP (diethyl phthalate), DHP (diheptyl phthalate), DOP (dioctyl phthalate), DINP (diisononyl phthalate), DIDP (diisodecyl phthalate), BBP (butyl benzyl phthalate), DLP (dilauryl phthalate), DCHP (dicyclohexyl phthalate), tetrahydrophthalic anhydride ester, DOZ (di-2-ethylhexyl azelate) and DBS (dibutyl sebacate).

In the rubber composition for tires of the present invention, an antiscorching agent may be used for preventing or retarding scorching, for example, organic acids such as phthalic anhydride, salicylic acid and benzoic acid, nitroso compounds such as N-nitrosodiphenylamine, and N-cyclohexylthiophthalimide.

The method for producing a tire using the rubber composition of the present invention is not particularly restricted and methods conventionally used may be adopted, for example, a method in which a rubber composition of the present invention is extruded into the shape of a component of a tire before vulcanization and then pressed with a tire forming machine to yield a tire.

The rubber composition of the present invention can be suitably applied to various tires such as those for passenger cars, for buses and trucks and for heavy industrial machines. A tire T has a bead 1, a sidewall 2 and a tread 3. In bead 1, a bead core 4 is embedded. A carcass 5 is arranged which bridges from one bead 1 to the other bead and both ends of which are folded back to hook on bead core 4. A belt layer 6 composed of two or more belt plies located outside the crown portion of carcass 5 is also arranged. In the region surrounded by carcass 5 and a fold-back portion 5a, a bead apex 7 extending from the upper end of the bead core toward the sidewall is arranged. The rubber composition of the present invention can be employed suitably for forming typically a tread, a sidewall, a carcass ply, a belt ply and the like of a pneumatic tire.

EXAMPLES

The present invention is described in more detail below with reference to Examples, but the invention is not limited thereto.

<Preparation of Rubber Composition>

The masterbatch was prepared by kneading the ingredients shown in Table 1 except the sulfur and the vulcanization accelerator at 130-140° C. for 5 minutes using a 1.7-liter hermetic mixer. Sulfur and a vulcanization accelerator were added to the master batch and kneaded at 50° C. for 5 minutes using an 8-inch open roll. Thus, an unvulcanized rubber composition was obtained. The composition was subjected to press vulcanization at 170° C. for 20 minutes to yield a rubber composition of an Example or a Comparative Example. For the unvulcanized rubber compositions and the rubber compositions obtained therefrom, the characteristic evaluations shown below were conducted.

<Processability>

For each unvulcanized rubber composition, the Mooney viscosity (ML1+4) was measured at 130° C. in accordance with the method for measuring Mooney viscosity provided in JIS K6300 and then the Mooney viscosity index defined by the following formula was calculated. The larger the Mooney viscosity index, the lower the Mooney viscosity is and the better the processability is.

Mooney viscosity index=($ML$(1+4) of Comparative Example 1)/($ML$(1+4) of an individual Example or Comparative Example)×100

The results are shown in Table 1.

<Abrasion Resistance>

For the resulting rubber compositions, the amount of Lambourn abration of the rubber composition of an individual Example or Comparative Example was measured under conditions: a temperature of 20° C., a slip ratio of 20% and a test time of 5 minutes using a Lambourn abrasion tester and then the volume loss of the rubber composition was calculated, followed by calculation of an abrasion index defined by the following formula. The larger the index, the better the abrasion resistance.

Abrasion index=(volume loss of Comparative Example 1)/(volume loss of an individual Example or Comparative Example)×100

The results are shown in Table 1.

<Rolling Resistance Property>

For the resulting rubber compositions, the tan δ of the rubber composition of an individual Example or Comparative Example was measured under conditions: a temperature of 70° C., an initial strain of 10% and a dynamic strain of 2%, using a viscoelasticity spectrometer "VES" (made by Iwamoto Seisakusho Co., Ltd.) and then the rolling resistance index defined by the following formula was calculated. The larger the rolling resistance index, the better the rolling resistance property.

Rolling resistance index=(tan δ of Comparative Example 1)/(tan δ of an individual Example or Comparative Example)×100

The results are shown in Table 1.

<Wet Grip Performance>

For the resulting rubber compositions, wet skid was measured according to the method of ASTM E303-83 using a portable skid tester made by Stanley Co., Ltd. and a wet skid index defined by the following formula was calculated. The larger the wet skid index, the better the wet grip performance.

(Wet skid index)=(measurement of an individual Example or Comparative Example)/(measurement of Comparative Example 1)×100

The results are shown in Table 1.

<Biodegradability Test>

(Precultivation of Microorganisms)

A culture medium of the composition shown below was prepared and then sterilized in an autoclave at 121° C. for 20 minutes. Then, the culture medium was divided into 20-ml portions in sterilized culture dishes, followed by solidification. Thus, culture medium plates were produced. On each of the culture medium plates, one platinum loop of Ceriporiopsis subvermispora FP90031 was inoculated and precultivated at 28° C. for seven days.

Culture Medium for Precultivation

Potato dextrose powder made by Nissui Pharmaceutical Co., Ltd.: 39.0 g

Distilled water: 1 L

The potato dextrose powder includes 4.0 g of potato leachate, 20.0 g of grape sugar and 15.0 g of agar.

<Degradation Experiment of Rubber Composition>

From each of the rubber compositions of the Examples and Comparative Examples prepared in the above-mentioned way, rubber sheets sized 20 mm×20 mm×2 mm were cut and used as samples for degradation experiment. For each of the rubber compositions, three rubber sheets were placed in a flask containing 80 g of sea sand, 20 ml of distilled water and 10 g of pieces of wood, followed by addition of 10 ml of a culture medium with the composition shown below. Then, the flask was sealed with a silicone stopper and subjected to sterilization treatment in an autoclave at 121° C. for 20 minutes. Subsequently, the culture medium plate resulting from the aforementioned precultivation was punched with a cork borer, yielding cylindrical bacteria pellets about 4 mm in diameter. On the culture medium in the flask sterilized, five bacteria pellets were planted. The bacteria-planted flask was placed in a thermostatic oven, followed by static incubation at a temperature of 28° C. and a humidity of 70% for 100 days.

Culture medium for degradation experiment

Glucose: 700 mg

Corn steep liquor: 700 mg

Distilled water: 100 ml

After completion of the incubation, the rubber sheets were collected from the flask and washed with 70% by mass of ethanol. After drying, the rubber sheets were weighed and the rate of mass decrease (%) was calculated while the mass before the incubation was taken as 100%. The results are shown in Table 1.

TABLE 1

|  | Example 1 | Example 2 | Example 3 | Example 4 | Example 5 | Comparative Example 1 | Comparative Example 2 |
|---|---|---|---|---|---|---|---|
| Natural rubber[Note 1] | 100 | 100 | 100 | — | — | 100 | — |
| Epoxidized natural rubber[Note 2] | — | — | — | 100 | 100 | — | 100 |
| Silica[Note 3] | 50 | 50 | 60 | 60 | 60 | 60 | 60 |
| Silane coupling agent[Note 4] | 6 | 6 | 6 | 6 | 6 | 6 | 6 |
| Aroma oil[Note 5] | 10 | 10 | — | — | — | 10 | 10 |
| Polylactic acid[Note 6] | 10 | — | — | — | — | — | — |
| Polybutylene succinate[Note 7] | — | 10 | — | 10 | — | — | — |
| Polycaprolactone[Note 8] | — | — | 10 | — | 10 | — | — |
| Age inhibitor[Note 9] | 1 | 1 | 1 | 1 | 1 | 1 | 1 |
| Stearic acid[Note 10] | 2 | 2 | 2 | 2 | 2 | 2 | 2 |
| Zinc oxide[Note 11] | 3 | 3 | 3 | 3 | 3 | 3 | 3 |
| Sulfur[Note 12] | 1.5 | 1.5 | 1.5 | 1.5 | 1.5 | 1.5 | 1.5 |
| Vulcanization accelerator TBBS[Note 13] | 1 | 1 | 1 | 1 | 1 | 1 | 1 |
| Vulcanization accelerator DPG[Note 14] | 1 | 1 | 1 | 1 | 1 | 1 | 1 |
| Mooney viscosity index | 99 | 102 | 103 | 104 | 106 | 100 | 103 |
| Abrasion index | 98 | 101 | 106 | 109 | 111 | 100 | 105 |
| Rolling resistance index | 106 | 109 | 104 | 102 | 103 | 100 | 94 |

TABLE 1-continued

|  | Example 1 | Example 2 | Example 3 | Example 4 | Example 5 | Comparative Example 1 | Comparative Example 2 |
|---|---|---|---|---|---|---|---|
| Wet skid index | 103 | 102 | 102 | 103 | 104 | 100 | 108 |
| Rate of mass decrease (%) | 22.2 | 29.1 | 34.1 | 39.9 | 43.5 | 19.2 | 28.6 |

(Note 1)The natural rubber is RSS#3.
(Note 2)The epoxidized natural rubber is "ENR-50" (epoxidation ratio: 50% by mol) manufactured by Kumplan Guthrie Berhad (Malaysia).
(Note 3)The silica is "Ultrasil VN3" ($N_2SA$: 210 $m^2/g$) manufactured by Degussa.
(Note 4)The silane coupling agent is "Si266" (bis(3-triethoxysilylpropyl)disulfide) (average value of 1:2.2) manufactured by Degussa.
(Note 5)The aroma oil is "JOMO Process X140" manufactured by Japan Energy Corp.
(Note 6)The polylactic acid is "Lacea H-100J" (molecular weight: 170,000; Tg: 59° C.) manufactured by Mitsui Chemicals, Inc.
(Note 7)The polybutylene succinate is "Bionolle #1003" (molecular weight: 83,000; Tg: −32° C.) manufactured by Showa Highpolymer Co., Ltd.
(Note 8)The polycaprolactone is "Celgreen PH7" (molecular weight: 10,000; Tg: −60° C.) manufactured by Daicel Chemical Industries, Ltd.
(Note 9)The age inhibitor is "NOCRAC 6C" (N-(1,3-dimethylbutyl)-N'-phenyl-p-phenylenediamine) manufactured by Ouchi Shinko Chemical Industrial Co., Ltd.
(Note 10)The stearic acid is manufactured by NOF Corp.
(Note 11)The zinc oxide is "Zinc Oxide type 1" manufactured by Mitsui Mining and Smelting Co., Ltd.
(Note 12)The sulfur is "powdery sulfur" manufactured by Tsurumi Chemicals Co., Ltd.
(Note 13)The vulcanization accelerator TBBS is "Nocceler NS" (N-tert-butyl-2-benzothiadiadyl-sulfenamide) manufactured by Ouchi Shinko Chemical Industrial Co., Ltd.
(Note 14)The vulcanization accelerator DPG is "Nocceler D" (N,N'-diphenylguanidine) manufactured by Ouchi Shinko Chemical Industrial Co., Ltd.

The results in Table 1 show that in Examples 1 to 5 using rubber compositions including a biodegradable aliphatic polyester, increase in rolling resistance index and wet skid index was achieved while maintaining a Mooney viscosity index and an abrasion index equal to or more than those of Comparative Examples 1 and 2, which include no biodegradable aliphatic polyester. Therefore, it is shown that use of a rubber composition of the present invention makes it possible to reduce fuel consumption through improvement in rolling resistance property and also to obtain a pneumatic tire having an improved wet grip performance while maintaining processability and abrasion resistance. The fact that the rate of mass decrease in a degradation experiment tends to be higher in Examples 1 to 5 in comparison to Comparative Examples 1 and 2 shows that rubber compositions of the present invention are excellent in biodegradability.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A pneumatic tire comprising a tread and a sidewall, wherein one or more portions of said tire is formed from a rubber composition comprising 100 parts by mass of a rubber component comprising a natural rubber and/or a diene rubber and 0.5 to 80 parts by mass of a biodegradable aliphatic polyester,
wherein said biodegradable aliphatic polyester is polybutylene succinate having a glass transition temperature within the range of from −70° C. to 30° C.; and
wherein said rubber composition further comprises silica in an amount within the range of from 5 to 150 parts by mass of based on 100 parts by mass of the rubber component and a silane coupling agent in an amount within the range of from 1 to 20% by mass based on the content of the silica.

2. The pneumatic tire according to claim 1, wherein the biodegradable aliphatic polyester has a weight-average molecular weight within the range of from 500 to 800,000.

3. The pneumatic tire according to claim 1, wherein the rubber component comprises a functional group-containing natural rubber and/or a functional group-containing diene rubber each having at least one kind of functional group selected from the group consisting of an alkoxyl group, an alkoxysilyl group, an epoxy group, a glycidyl group, a carbonyl group, an ester group, a hydroxyl group, an amino group and a silanol group.

4. The pneumatic tire according to claim 1, wherein the rubber component comprises an epoxidized natural rubber.

5. The pneumatic tire according to claim 1, wherein the biodegradable aliphatic polyester is present in an amount of 1 to 60 parts by mass.

6. The pneumatic tire according to claim 1, wherein the biodegradable aliphatic polyester is present in an amount of 2 to 50 parts by mass.

* * * * *